United States Patent [19]

Moore

[11] 4,268,964
[45] May 26, 1981

[54] APPARATUS FOR CUTTING, TRIMMING AND EDGING VEGETATION AND THE LIKE

[75] Inventor: James R. Moore, Columbus, Miss.

[73] Assignee: AMBAC Industries, Incorporated, Farmington, Conn.

[21] Appl. No.: 53,827

[22] Filed: Jul. 2, 1979

[51] Int. Cl.³ ............................................ A01D 50/00
[52] U.S. Cl. ........................................ 30/276; 56/12.7
[58] Field of Search ................... 30/276, 347; 56/12.7, 56/295; 172/13, 14, 15, 16

[56] References Cited

U.S. PATENT DOCUMENTS

| | | | |
|---|---|---|---|
| 3,208,209 | 9/1965 | Dunlap | 56/295 |
| 3,656,286 | 4/1972 | Glunk | 56/295 |
| 3,708,967 | 1/1973 | Geist | 56/12.7 |
| 4,107,841 | 8/1978 | Rebhun | 30/276 |
| 4,118,865 | 10/1978 | Jacyno | 30/276 |
| 4,190,954 | 3/1980 | Walto | 30/347 |

Primary Examiner—Jimmy C. Peters
Attorney, Agent, or Firm—John C. Dorfman

[57] ABSTRACT

Handle means provides a frame on which a cutter head may be supported spaced from a hand grip whereby, when the user is standing, the cutter head may be positioned adjacent the ground. The cutter head is a rotatable head including attachment means for attaching at least one flexible flail which extends outward when rotated. The drive means may be electrical or other motor means preferably mounted proximate to the cutter head, but including versions mounted remotely but having an extended flexible shaft enabling drive of the cutter head attached to the rotatable shaft. A circular shield is rotatably supported on the shaft, so that it is independent of the shaft's rotation, preferably outboard of the cutter head. The cutter head provides attachment means which may simply be a hole associated with and opposed to a post or hook, whereby a loop or bight of filamentary material may be placed over the hook or post and the filamentary material extended through the hole which is radially outboard of the motor shaft.

7 Claims, 4 Drawing Figures

APPARATUS FOR CUTTING, TRIMMING AND EDGING VEGETATION AND THE LIKE

The present invention relates to improved apparatus for cutting, trimming and edging vegetation and the like. In particular, the present invention relates to the type of cutter which employs a flexible filament, string or wire (herein called "flail") which is supported on or driven by the rotatable shaft of an electric motor or engine that is used as a drive means. If the drive means is small, a handle for the drive means, in turn, is held by a standing user to position the rotating flail near the ground. In particular, the present invention concerns improvements whereby the flail may be readily replaced. An additional structure is disclosed which acts both as a shield and as a guide for use of such applications as edging.

The popularity of weed cutters of the type of the present invention has promoted a great deal of patented art directed to all sorts of aspects of the construction of various modifications of the tool. The prior art in particular is repleat with devices providing spools of filament to afford a steady supply of cutting filament material as the working end or flail becomes worn. These concepts, in turn, have required various ways for holding the filament so that it does not feed unwanted additional amounts at unwanted time, means for preventing tangling of the filamentary material and permitting smooth feed thereof, and many more.

One of the improvements of the present invention is that it completely avoids the need for supplies of filamentary material by providing for convenient and easy replacement of flails selected lengths. An advantage of this invention is that it permits manual replacement in very little more time than needed to pull out extra length of the filamentary material and at the same time avoids all the complications of the prior art, such as tangling, failure of the operation of the mechanism, etc. The present invention also permits, without any adjustment, the replacement of the flail, if that becomes important.

The present invention also relates to an improvement whereby the structure supporting the flail is protected or shielded in a new and different way. The shield also can be used as a guide or roller member to permit trimming along sidewalks, or the like. The present invention permits proper spacing of the flail from the ground when it is used in horizontal rotating position. The shield is preferably located below the rotating flail so that rather than having to guess about spacing as in the prior art and risk hitting the rotating structure against stones or other objects which might damage the structure, the shield is always in position to protect the solid rotating structure. The shield also facilitates use of the apparatus in a tilted position to trim along walkways by providing the shield extension to such a radius that only a desired length of the flail is exposed. The shield itself is made rotatable so that it can roll along a sidewalk or curb and thereby facilitate greater precision in the edging operation.

More specifically, the present invention in the preferred form relates to an apparatus for cutting vegetation and the like comprising a drive means having a stationary portion and a rotatable drive shaft. Handle means attached to the stationary portion of the drive positions the drive means or allows extension of the drive shaft to a position whereby a user, by holding the handle, may position the shaft of the drive means close to the ground. A rotatable cutting head including attachment means is connected to the drive shaft. The attachment means includes a member which extends radially outward from the shaft to a position where hook means is provided. In a preferred combination, the hook means may simply be a post, although a hook having an element extending back toward the shaft is still preferred. In this preferred embodiment, a hole somewhat larger than the flail to be used is provided on the same structure, radially further out from the shaft. The flail employed is preferably provided with a loop which fits over the post which holds the flexible flail string against the action of centrifugal force and other forces imposed by cutting action. The flail is fed through a hole the walls of which provide a "fulcrum" point against which it can work. The term "hook means" as used herein encompasses any means to engage a special portion of a flail such as a bight, a loop, or a bulge. For example, a hole through an attachment structure alone would be a "hook" where a bulge or enlarged diameter bulb is provided at the end of the flail. The function of this hook is to engage and hold a portion of the flail against centrifugal and other forces.

The improvement relating to the shield has to do with an apparatus for cutting vegetation and the like, again, having driving means having a stationary portion and a rotatable drive shaft. In the preferred form, a handle is attached to the stationary portion and extends to a position to enable a user while standing to support the drive means near the ground. Attachment means is provided on the shaft and at least one flexible flail is attached thereto. The shield member, generally circular in shape and rotatably supported, is further spaced from the drive means than the flail in a plane generally parallel to the plane of rotation of the flail and has its axis on the axis of rotation of the flail. Means to support the guard means to permit rotation about its common axis with the flail but independently from the flail, completes the structure. Ordinarily, the rotatable support for the shield is on the shaft itself.

For a better understanding of the present invention, reference is made to the accompanying drawings in which.

Figure 1:
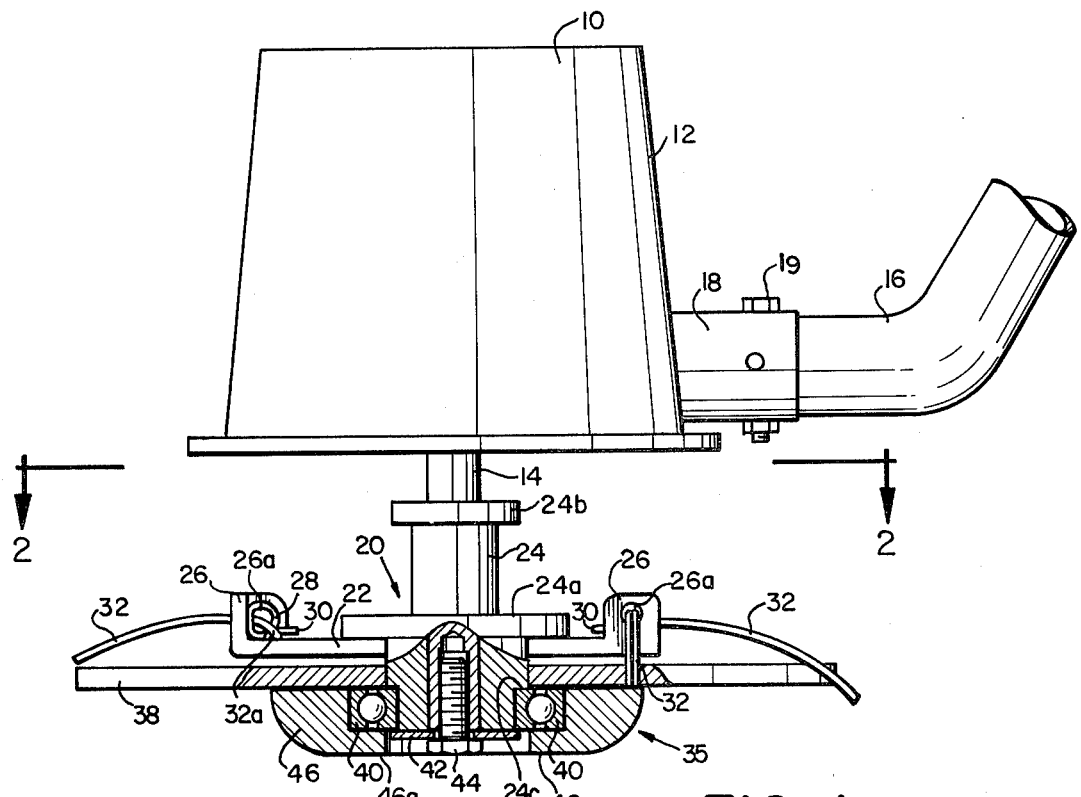
FIG. 1 is a side elevational view of the operational part of the cutter showing the lower portion thereof broken away and viewed as an axial section.
Figure 2:
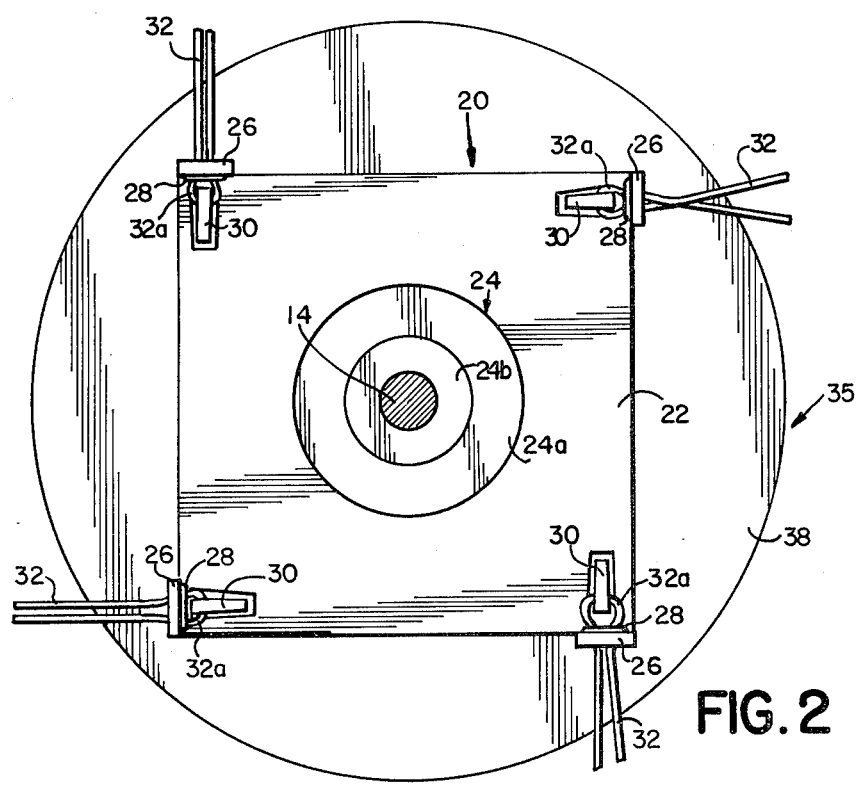
FIG. 2 is a sectional view taken along line 2—2 of FIG. 1.

Referring first to FIG. 1, it will be seen that only a portion of the apparatus for cutting vegetation and the like has been shown. The part which is shown includes drive means 10 which may be any suitable kind of motor means. Commonly, this is an electrical motor means which may either be battery operated or provided with suitable electrical lines (not shown) for connection to an outlet. Since either form is entirely conventional, the invention resides elsewhere and no showing has been made of the motor means in detail nor of its controls which are conventional. In fact, the motor means alternatively may be a small gasoline engine, if desired. The motor means of whatever kind consists of a housing 12, which houses and is part of the overall stator. The "stator" as used herein includes at least the housing, conventional motor stator means and bearing support means. A rotor is rotatably supported by the bearings. Ordinarily the drive means is a d.c. motor with commutator and brushes (none of the structure being shown or being relevant to the present invention). Whatever the drive means, selected, however, an output rotational shaft 14 is provided.

Attached to the housing 12 is a handle means 16 which in accordance with the present invention may be attached to the housing through a collar 18 with suitable releasable locking means 19. The locking means 19 may be a bolt as shown passed through a common set of vertically aligned holes in the handle 16 and one set of diametrically aligned holes in collar 18 in the cutting head attitude of FIG. 3 and another set of holes at approximately 90° to the first in the attitude of FIG. 4. When the locking means is released to permit rotation of the handle 16 within the collar 18, the handle may be repositioned for more convenient use in the job to be done. Although the structure of much of the handle is not shown, various types of handles are well-known and have the common property that they extend upwardly to means for gripping the handle. Motor control switches may be provided on the upper part of the handle whereby a user may support and manipulate the drive means close to the ground while standing in an erect position. If controls are provided, the handle is commonly a tubular structure permitting the wires to be fed internally through the handle 16 and the collar 18 into the housing 12 for connection to motor control circuitry and the motor itself, and possibly a battery.

The present invention concerns itself with the operational part of the device which is ordinarily attached to the rotatable shaft 14. It will be observed that in this particular embodiment, any cowl or hood for the device is omitted, but it may be optionally included in other embodiments, if desired. In this embodiment, a rigid metallic flail support structure, generally designated 20, is attached to shaft 14 to rotate with the shaft. The rotatable support provides the support for the easily attached and detached flail members to be described. In this particular embodiment, the hooks which support the flails are part of a square plate 22 attached to a lower flange 24a of a hub structure which also is provided with a smaller upper flange 24b. The lower flange 24a may be attached to the plate 22 by welding, brazing or other appropriate means. Each of the four corners of plate 22 is provided an upturned flange 26. In this embodiment, each flange 26 is an integral part of the plate 22, bent at right angles thereto. The position of the flange is immediately adjacent the corner along one edge only. The exact position of a flail is not material to the invention nor is the specific construction. However, any more than the specific construction is material. The flange functions to provide a reference support relative to which the flail moves. In this case a "fulcrum", hole 26a, is provided having a coined rounded edge 28 to minimize wear by presenting smooth, rounded, low friction surfaces to the flail, the region where it will bend and flex. A narrow slot would function in the same way. Behind the hole, closer to the center of rotation, but in this case not radially aligned, is a hook. In this case, the hook takes the form of a cleat which provides not only a post extending above the plate 22 in the same direction as the flanges 26 but also a portion is bent away from the flanges. With such a cleat or hook, the fulcrum provided by the hole in the flange 26 might be omitted, but in many cases having both facilitates keeping the flail in place, particularly until it must be replaced. The hooks or posts, and in this case cleat, serves to support a loop 32a at one end of the flail 32. In this case, the loop is provided simply by a bight and the double string of the flail. The flail material may be, and preferably is monofilament line, such as that used commonly in fishing lines, but it may be of other materials such as metallic wire, fibrous material or synthetic material. The loop may be formed by a ring, even of different material, attached to the fibrous material. It may be a loop tied into the end of a single strand or a multiple strand or it may be formed in any other desired way. The loop provides means to be held around the hook or post which is behind and transverse to the opening, and preferably is a cleat that is bent away from the opening as well, to better hold the loop of the flail in place. The flail itself is fed through the opening and thereby directed and provided a bending place or fulcrum. The flail is also held in position relative to the post so that despite the buffeting that it takes or the other forces that work upon it, it will tend to remain in position in the post, and this, of course, is particularly true if the post is extended or formed as a cleat as shown.

The structure of the present invention provides a very simple way to replace the flails by simply removing the loop from the post or cleat and pulling the flail back through the opening. A new flail is put in place by feeding the filament partially through the opening, placing the loop over the post or cleat, and pulling the flail outwardly until it firmly engages the post or cleat. The skill required for doing this job is minimal, and it can be done by hand almost as quickly in terms of the total job of inverting the tool into proper position as adjusting string length in prior art devices. Moreover, the invention provides the advantage that flails of different preselected lengths may be employed or that flails of different material may be employed for different application and readily replaced. Before the kind of material can be changed in prior art devices, spools or other supplies must be replaced, rethreading has to take place and the process is time consuming.

The shield structure generally designated 35 preferably consists of a circular disc 38 which is supported to rotate about its axis on shaft 14. Although it conceivably may be attached to other structure, it is preferred that it be attached to the shaft 14 outboard of the flails 32. This may be conveniently done by extending the hub 24 as shown in a stepped shoulder portion 24c which accepts the inner race of ball bearing 40 between the shoulder 24c and an end washer 42. This assembly is held in place against the end of the shaft by axially aligned stud bolt 44. The hub may be keyed, splined or press fitted into position on the shaft, using various conventional techniques to prevent relative rotation. The outer races of the bearings 40 are fixed to a shield mounting block 46 which is, in turn, fixed to the disc shield 38. Thus, it will be seen that the shield structure 46, 38 is rotatable relative to the shaft but can be held stationary, for example, when the shaft is rotating. Alternatively, the shield can be caused to rotate at a different speed from the shaft as use dictates. It will also be noted that the shield mounting block 46 has an inward extending radial flange 46a which is kept out of contact with the inner race, as is plate 38, but is very close-spaced thereto and is close-spaced to the closure washer 42. The shield by its position in this way protects the bearing and by preferably extending below the bottom of the rotating shaft, the shield protects the rotating structure as a whole.

Figure 3:
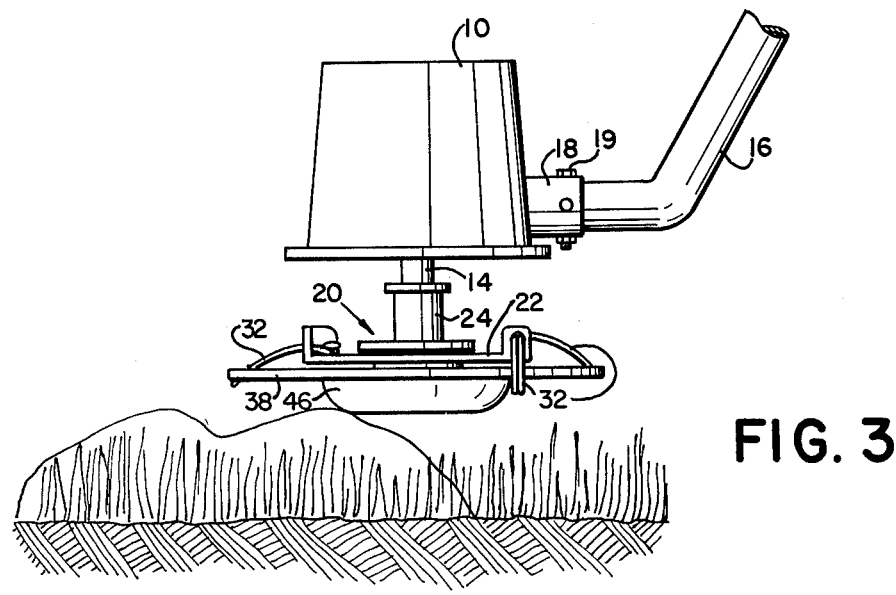
FIG. 3 is a perspective view showing the functioning of the shield member of the present invention in conventional operation.

Referring now to FIG. 3, the structure used in conventional fashion is shown wherein the mounting block portion 46 acts with the shield 38 to protect the the structure against stones in the lawn when contacted as the apparatus is used in cutting grass. The shield may be stopped but does not prevent the cutter from continuing to rotate. Thus, the overall rotational structure is protected and less subject to damage than prior art devices. The shield may also be provided in modified forms so that it is axially adjustable along the length of the shaft to provide different height adjustments to assure minimum length of cut into vegetation which is being cut in conventional horizontal operation as shown in FIG. 3.

Figure 4:
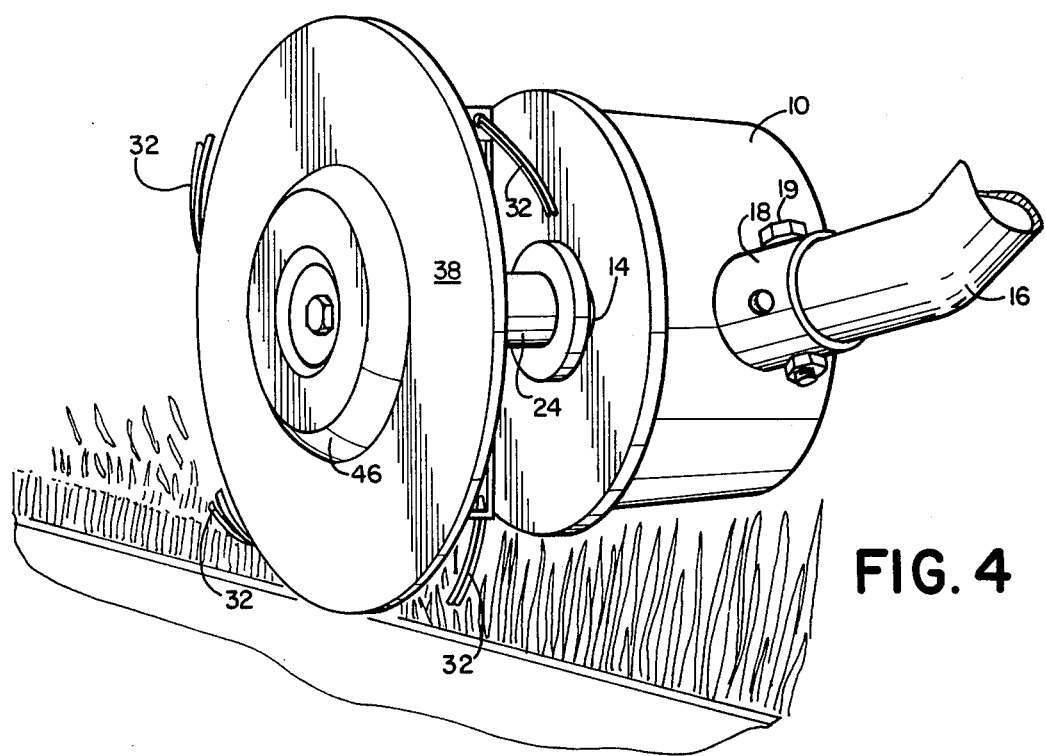
FIG. 4 is another perspective view showing the use of the apparatus of the present invention as a trimmer along a sidewalk.

FIG. 4 shows operation in a mode in which the structure is tilted so that the axis has at least a horizontal component and the structure is operating in some plane having a vertical component. In this mode of operation, the handle 16 may be adjusted in position as previously suggested. The edge of the disc 38 is used as a guide or spacer and is rolled along a sidewalk or curb, or other structural border to permit trimming of grass or other vegetation along that edge. The use of the shield as a spacer provides a primarily new application for devices of this class, or at least permits the devices to be used better for such applications than in the past.

Various modifications to the cutter device disclosed herein have been suggested. Other modifications, such as the use of a small internal combustion engine in place of an electric motor spaced away from the cutter head and connected by a flexible drive shaft, will occur to those skilled in the art. These and other modifications within the scope of the claims are intended to be within the scope and spirit of the invention.

I claim:

1. An apparatus for cutting vegetation and the like comprising:
   a rotatable cutting head including attachment means for attaching at least one flexible flail which extends outward in a plane essentially perpendicular to the axis during rotation;
   handle means providing hand grip means and supporting the rotatable cutting head spaced from the handle means to enable a user, while standing, to support the cutting head near the ground in selected attitudes including with its axis of rotation generally perpendicular to the ground,
   a motor supported on the handle means remote from the hand grip so that its rotatable shaft and the cutting head which it supports and drives may be positioned selectively either generally parallel or perpendicular to the ground while held by the handle when the user is standing, and;
   a shield formed so as to alternatively function as a wheel that is rotatably supported on the drive shaft outboard from the cutting head, spaced from and parallel to the plane of rotation of the flail, so that the shield is independent of the rotation of the shaft and is functionable in supporting and positioning the cutting head when its axis of rotation is horizontal to the ground.

2. An apparatus for cutting vegetation and the like comprising:
   a rotatable cutting head including attachment means for attaching at least one flexible flail which extends outward in a plane essentially perpendicular to the axis during rotation;
   handle means providing hand grip means and supporting the rotatable cutting head spaced from the handle means to enable a user, while standing, to support the cutting head near the ground in selected attitudes including with its axis of rotation generally perpendicular to the ground;
   adjustment means whereby the attitude of the cutting head may be adjusted by releasable positioning means permitting adjustment of the cutting head relative to the handle means;
   a drive means supported by the handle means and providing a rotatable drive shaft connected to and driving the rotatable driving head, and;
   a shield generally circular in shape and rotatably supported on the drive shaft outboard from the cutting head, spaced from and parallel to the plane of rotation of the flail, so that the shield is independent of the rotation of the shaft.

3. The apparatus of claim 2 in which the releasable positioning means permits holding the cutting head generally parallel to the ground with the axis of rotation vertical or with the axis of rotation generally horizontal so that the shield may be used as a guide for edging.

4. The apparatus of claim 2 in which the driving means is an electric motor.

5. An apparatus for cutting vegetation and the like comprising:
   a drive means having a stator portion and a rotatable drive shaft;
   handle means supporting the stator portion of the drive means arranged so that the drive shaft is located at one end of the handle means and providing a hand grip means at a position to enable a user while standing to support the drive shaft near the ground;
   attachment means on the shaft including means providing an associated hole and a hook, and;
   a continuous length of flexible monofilament material looped in a manner to double back upon itself forming a looped end and where said looped end is extended through said hole of said means and secured to said hook.

6. The apparatus of claim 5 in which the attachment means is a plate having at least one flange extending perpendicular to said plate and having the hole therein for receiving said continuous length of monofilament.

7. The apparatus of claim 5 in which the hook is a tang formed in a configuration so as to provide a wedging action upon the monofilament as it is pulled in one direction.

* * * * *